United States Patent
Prins et al.

(10) Patent No.: US 11,317,135 B2
(45) Date of Patent: Apr. 26, 2022

(54) IDENTIFYING USER DEVICES FOR INTERACTIVE MEDIA BROADCAST PARTICIPATION

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Martin Prins, The Hague (NL); Hans Maarten Stokking, Wateringen (NL); Simon Gunkel, Duivendrecht (NL)

(73) Assignees: KONINKLIKE KPN N.V., Rotterdam (NL); NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 16/472,796

(22) PCT Filed: Dec. 21, 2017

(86) PCT No.: PCT/EP2017/084125
§ 371 (c)(1),
(2) Date: Jun. 21, 2019

(87) PCT Pub. No.: WO2018/122100
PCT Pub. Date: Jul. 5, 2018

(65) Prior Publication Data
US 2020/0195999 A1  Jun. 18, 2020

(30) Foreign Application Priority Data
Dec. 27, 2016 (EP) .................................... 16206950

(51) Int. Cl.
*H04N 21/2665* (2011.01)
*H04N 21/258* (2011.01)
(Continued)

(52) U.S. Cl.
CPC ... *H04N 21/2665* (2013.01); *H04N 21/25825* (2013.01); *H04N 21/2743* (2013.01);
(Continued)

(58) Field of Classification Search
CPC ......... H04N 21/2665; H04N 21/25825; H04N 21/2743; H04N 21/4358; H04N 21/8545
(Continued)

(56) References Cited

U.S. PATENT DOCUMENTS 5,271,626 A * 12/1993 Llenas .................. A63F 13/005
273/430
6,569,012 B2 * 5/2003 Lydon .................... G06Q 10/06
463/9
(Continued)

FOREIGN PATENT DOCUMENTS

EP        2819416 A1    12/2014

OTHER PUBLICATIONS

The American Heritage Dictionary of the English Language, broadcast, (5th ed. 2016) (available at https://www.thefreedictionary.com/broadcast) (Year: 2016).*
(Continued)

*Primary Examiner* — David P Zarka
(74) *Attorney, Agent, or Firm* — Hamilton, Brook, Smith & Reynolds, P.C.

(57) ABSTRACT

A method of determining a group of user devices suitable for contributing user content to an interactive media broadcast may comprise: —transmitting a set of requirements to a first plurality of user devices (13), each user device having a set of capabilities, the set of requirements relating to using at
(Continued)

least part of the user content in the interactive media broadcast, —transmitting an invitation to a second plurality of user devices (13), the invitation being configured to cause a user device to produce a conditional response if the set of capabilities of the user device matches the set of requirements, and —identifying a group of user devices from which a conditional response was received. The method may further comprise selecting a group of user devices from the identified user devices. The selected group of user devices may include all identified user devices. The media broadcast may include an interactive television broadcast.

14 Claims, 7 Drawing Sheets (51) Int. Cl.
*H04N 21/2743* (2011.01)
*H04N 21/435* (2011.01)
*H04N 21/8545* (2011.01)
*H04N 21/45* (2011.01)
(52) U.S. Cl.
CPC ..... *H04N 21/4358* (2013.01); *H04N 21/4518* (2020.08); *H04N 21/8545* (2013.01)
(58) Field of Classification Search
USPC .......................................................... 709/231
See application file for complete search history.

(56) References Cited

U.S. PATENT DOCUMENTS

| | | | | |
|---|---|---|---|---|
| 7,614,955 | B2* | 11/2009 | Farnham | A63F 13/12 |
| | | | | 463/42 |
| 8,584,174 | B1* | 11/2013 | Fyock | H04N 21/4316 |
| | | | | 725/60 |
| 8,738,427 | B2* | 5/2014 | Damaghi | G06Q 90/00 |
| | | | | 705/14.1 |
| 9,258,580 | B1 | 2/2016 | Otero et al. | |
| 9,967,623 | B2* | 5/2018 | Waller | H04N 21/8586 |
| 2007/0244570 | A1* | 10/2007 | Speiser | G06Q 50/10 |
| | | | | 700/1 |
| 2007/0244585 | A1* | 10/2007 | Speiser | H04N 21/2743 |
| | | | | 700/91 |
| 2007/0250378 | A1* | 10/2007 | Hughes | G06Q 10/06398 |
| | | | | 705/7.42 |
| 2008/0221964 | A1* | 9/2008 | Berkovitz | G06Q 10/10 |
| | | | | 705/80 |
| 2009/0299835 | A1* | 12/2009 | Greenbaum | G06Q 30/0218 |
| | | | | 705/14.2 |
| 2010/0106604 | A1* | 4/2010 | Bhatia | G06Q 30/02 |
| | | | | 705/14.71 |
| 2013/0204692 | A1* | 8/2013 | Mallory | G06Q 30/02 |
| | | | | 705/14.36 |
| 2013/0260876 | A1* | 10/2013 | Margalith | A63F 13/85 |
| | | | | 463/29 |
| 2013/0324228 | A1* | 12/2013 | Barber | G07F 17/3276 |
| | | | | 463/25 |
| 2015/0058728 | A1* | 2/2015 | Haggerty | G06F 3/165 |
| | | | | 715/716 |
| 2015/0154529 | A1* | 6/2015 | Raajaratnam | G06Q 10/063114 |
| | | | | 705/7.15 |
| 2015/0169592 | A1* | 6/2015 | Castillo | G06F 16/44 |
| | | | | 707/736 |
| 2015/0222945 | A1* | 8/2015 | Jackson | H04N 21/6125 |
| | | | | 725/61 |
| 2015/0382039 | A1 | 12/2015 | Lewis et al. | |
| 2017/0050081 | A1* | 2/2017 | Jones | A63F 13/795 |
| 2017/0171581 | A1* | 6/2017 | Mulligan | H04N 21/4821 |
| 2017/0178200 | A1* | 6/2017 | Asin | G06Q 30/0277 |
| 2017/0228749 | A1* | 8/2017 | Larvol | G06Q 10/1053 |
| 2017/0361226 | A1* | 12/2017 | Mahoney | H04N 21/4758 |
| 2020/0082672 | A1* | 3/2020 | Wellisch | G07F 17/3288 |

OTHER PUBLICATIONS

European Search Report for Europe Application No. 16 206 950.4, entitled "Identifying User Devices for Interactive Media Broadcast Participation." dated Jul. 13, 2017.
International Search Report for International Application No. PCT/EP2017/084125, entitled "Identifying User Devices for Interactive Media Broadcast Participation." dated Mar. 22, 2018.

* cited by examiner

IDENTIFYING USER DEVICES FOR INTERACTIVE MEDIA BROADCAST PARTICIPATION

This application is the U.S. National Stage of International Application No. PCT/EP2017/084125, filed Dec. 21, 2017, which designates the U.S., published in English, and claims priority under 35 U.S.C. § 119 or 365(c) to Europe Application No. 16206950.4, filed Dec. 27, 2016. The entire teachings of the above applications are incorporated herein by reference.

FIELD OF THE INVENTION

The present invention relates to identifying user devices for broadcast participation. More in particular, the present invention relates to determining a group of user devices suitable for contributing content to a media broadcast, for example for use in interactive television programs.

BACKGROUND OF THE INVENTION

Television programs are normally broadcast. That is, the content of television programs is transmitted substantially simultaneously to a large amount of user devices, such as television sets, where the video content is displayed and the audio content is made audible. Digital television can be interactive, allowing users to provide information and influence the content of television programs, for example by voting for a particular candidate in a televised competition. A backchannel, separate from the broadcast channel used for the broadcast, may be used for sending and/or receiving additional information, such as voting information.

Interactive television services can be achieved by user devices which accept user input and provide this user input to the broadcast system. Some user devices are even capable of supplying not only user input but also user content. Such user content may be produced by the user, for example using the camera of a user device, or may be selected by the user, for example by selecting content items from a particular source, such as the internet. User produced or user selected content items may include video fragments, video clips, audio fragments, still images, and/or other content items. Such user content may be merged with the television content provided by the broadcast system, resulting in merged content which is broadcast.

However, not all user devices are suitable for providing content. Thus, when an interactive broadcast session is announced on television, not all users may be able to participate, and the broadcast system may not receive content from all user devices. The broadcast system may therefore request content from user devices which are incapable of delivering. This, in turn, may lead to delays or gaps in the broadcast, which is clearly undesirable. Also, the broadcast system may receive user content which has an unsuitable format or a resolution which is lower than desired, or which has been produced in an unsuitable environment. This may also lead to a lower quality broadcast.

The problems outlined above may not only occur in television broadcasts, but also in other types of media broadcast, live or recorded, such as Online TV, YouTube, Netflix and other broadcast services.

SUMMARY OF THE INVENTION

To solve these and other problems, the present invention provides a method of determining a group of user devices suitable for contributing user content to an interactive media broadcast, which method may comprise:

transmitting a set of requirements to a first plurality of user devices, each user device having a set of capabilities, the set of requirements relating to using at least part of the user content in the interactive media broadcast, transmitting an invitation to a second plurality of user devices, the invitation being configured to cause a user device to produce a conditional response if the set of capabilities of the user device matches the set of requirements, and identifying a group of user devices from which a conditional response was received.

These actions, which may be carried out by a broadcast system, serve to identify user devices which meet the requirements to contribute to the interactive media broadcast. Such requirements may include bandwidth, format, and other characteristics, which will later be discussed in more detail. The group of user devices which respond to the invitation is identified to determine a group of user devices suitable for contributing user content, that is, to determine a group of suitable user devices.

By sending a set of requirements to the user devices, and an invitation which is configured to cause a user device to produce a response if the user device matches the requirements, the user devices are made to compare their capabilities with the requirements, and to send a response if the requirements are met. Thus only the user devices meeting the requirements may send a response, and the response may therefore be conditional upon meeting the requirements. This allows the broadcast system to easily identify the suitable user devices, and consequently allows the broadcast system to disregard any non-suitable user devices.

The group of user devices which is allowed to contribute user content may be selected from the identified user devices, that is, from the user devices from which a (conditional) response was received. It is noted that in some cases, not a single response may be received, for example when no user device has a set of capabilities which meets the set of requirements. As a result, no user device will be identified, and the identifying action may not be carried out. Conversely, identifying the user devices from which a response was received may only be carried out if at least one response was received.

The method may therefore, in some embodiments, further include selecting a group of user devices from the identified user devices. By selecting a group of user devices from the identified user devices only, thus excluding other user devices, it is ensured that a group of user devices may be determined which are suitable for contributing user content.

Selecting a group of user devices from the identified user devices may include selecting all user devices, that is, selecting all user devices from which a (conditional) response was received. In some embodiments, however, the size of the group of user devices may be limited by selecting fewer than all identified user devices, for example a limited number of user devices. This limited number may be chosen on the basis of hardware limitations (the maximum available bandwidth, for example) or other limitations, such as the number of user content slots in a certain television program or other media program.

The capabilities of a user device may include its specifications, media capture conditions, transmission quality, and/or other parameters. The capabilities used in the method according to the invention may be determined by one or more sets of requirements, that is, the requirements may determine which capabilities a user device may use to find a match.

According to the invention, both the requirements and the invitation may be sent to a plurality of user devices. Although the requirements and the invitation may be sent to the same user devices, in some embodiments the requirements may be sent to a larger set of user devices, or to another set of user devices, than the set of user devices to which the invitation is sent.

Transmitting the set of requirements and transmitting the invitation may be carried out in two or more separate transmissions. That is, the broadcast system may first transmit the set of requirements (or part of the set of requirements) and then, possibly at a later point in time, transmit the invitation to the user devices. This may be advantageous if the set of requirements is large and therefore involves a relatively large amount of data. Also, the set of requirements, or part of the set of requirements, may only be retransmitted if the requirements change. In some embodiments, however, the set of requirements is transmitted together with the invitation. This may limit the number of transmissions and may ensure that the invitation is associated with the latest set of requirements.

Transmitting the set of requirements and transmitting the invitation may be carried out by broadcasting the requirements and/or the invitation. That is, the requirements and/or the invitation may be broadcast, for example as metadata, and may for example be included in a manifest file.

In some embodiments, a set of requirements may include a set identification and the invitation may also include a set identification, thus making it possible to associate a set of requirements with an invitation and avoiding associating an outdated or otherwise incorrect set of requirements with an invitation. In some embodiments, at least part of the requirements may be pre-stored in the user device and may therefore not be transmitted together with an invitation, for example. Such pre-stored requirements may, for example, include user preferences.

The set of requirements may relate to the media broadcast and may include requirements which allow user content to be used in the media broadcast, which may be an interactive media broadcast. The requirements may relate to at least one of user device capabilities, connection characteristics, sensory data, location data, and user personal data. Requirements may therefore relate to bandwidth, audio format, video format, etc.

The invitation may be configured to produce a response if a user device matches the set of requirements. That is, the invitation may contain instructions which may cause the user device to compare the set of requirements with the set of capabilities of the user device, which in turn may cause the user device to produce a response when there is a match between the set of requirements and the set of capabilities, and to transmit this conditional response so the broadcast system is notified of the match. The conditional response may include a user device ID or other identification.

The set of requirements may be smaller than the set of capabilities, that is, there may be fewer requirements than capabilities. If the set of requirements is larger than the set of capabilities, there may be no match. In some embodiments, a response may be produced even if there is no perfect match, that is, even if not all requirements are met. In such embodiments, there may be at least two types of requirements: essential requirements, which must be met for there to be a match, and optional requirements, which are preferably met but which may still allow a match when they are not met.

It is noted that the set of requirements may contain a single requirement, but may also contain two or more requirements, for example ten, twenty or thirty-three requirements. The number of requirements may depend on the type of broadcast and the type of user content which is used in the broadcast.

The requirements may relate to at least one of user devices capabilities, connection characteristics, sensory data, location data (for example GPS coordinates), user surroundings, and user personal data. User surroundings may include the temperature, amount of light, amount of sound, etc. at the location of the user. User personal data may include the user's age, gender, preferences, etc.

The method may further include establishing a connection with at least one or with each user device of the identified (and/or selected) group of user devices to receive user content. That is, the broadcast system may establish a connection, for example a direct connection, with each selected user device, to directly request and receive user content. Establishing such a connection may serve as an acknowledgement that the user device has been selected. If no additional connection with the broadcast system is established, the broadcast may send an acknowledgement message to the selected user device(s). In response to an acknowledgement, a user device may establish a connection with the broadcast system if no connection has been established yet, and may transmit user content.

It is noted that a user device may transmit user content to the broadcast system as soon as the connection is established. Alternatively, or additionally, a user device may only transmit user content in response to a content request transmitted by the broadcast system.

The method of determining a group of user devices suitable for contributing content to a media broadcast may further comprise receiving user content from the identified (and/or selected) group of user devices, and broadcasting the media content comprising at least part of the received user content. That is, the identified user devices may be used for obtaining user content, which may then be used in the media broadcast, together with the original media content. The combined content, that is, the user content provided by the identified user devices and the original media content provided by the broadcast system, may then be broadcast, for example by using the same or another media broadcast channel.

The invention additionally provides a method for a user device to determine its suitability to contribute user content to a media broadcast, which method may comprise:

receiving a set of requirements relating to using at least part of the user content in the interactive media broadcast, receiving an invitation configured to cause the user device to produce a conditional response, comparing the set of requirements with a set of capabilities stored in the user device, and transmitting the conditional response if the set of requirements matches the set of capabilities.

These actions may be carried out by a user device, such as an interactive media apparatus, a desktop computer, a laptop computer, a set-top box or a smartphone. It is noted that the user device may retrieve its set of capabilities from another device, such as a server or an auxiliary device (such as a second screen device), and only temporarily store the set of requirements itself.

The invitation may be configured to cause the user device to compare the set of requirements with its capabilities and to produce a response if, and in some embodiments to what extent, the capabilities match the requirements, and may be configured not to produce a response if there is no match. The response may therefore be a conditional response. The invitation may further be configured to cause the user device to compare the set of requirements with its capabilities and to produce a response if, and only if, the capabilities match the requirements.

The user device may cooperate with an auxiliary device, such as a second screen device, which may have additional capabilities. Accordingly, the set of capabilities may include auxiliary capabilities of an auxiliary user device with which the user device is able to communicate. In other words, the user device may be associated with another device having additional capabilities, which additional capabilities may be used by the user device. For example, the user device may be a set-top box which has neither a camera nor a microphone. However, the set-top box may be connected with a television apparatus which serves as auxiliary device, and which may have both a camera and a microphone, as well as a display screen and loudspeakers. The user device (the set-top box in the present example) may then additionally use the capabilities of the television apparatus for the comparison between the set of capabilities and the set of requirements. Thus, the method for a user device to contribute user content may comprise forwarding the set of requirements to the auxiliary device, and may also comprise receiving auxiliary capabilities from the auxiliary user device.

In an embodiment, the method for a user device to determine its suitability to contribute user content to a media broadcast, such as an interactive media broadcast, may include at least one capability in the conditional response. That is, one or more capabilities of the set of capabilities of the user device (and possibly any auxiliary device) may be included in the response, which may allow a broadcaster to, for example, adjust its broadcast to one or more of the capabilities so as to further improve the merging of user content.

The response may comprise at least part of the capabilities of the user device. Additionally, or alternatively, the user device may transmit further capabilities that have no counterpart in the set of requirements to the broadcast system. This may optimize the selection of the user devices(s), for example by selecting a user device that is closest or has the best viewpoint to a certain location, or that can offer the best quality content in terms of resolution, capture conditions or otherwise.

The user content may, at least partially, be used as part of an interactive media broadcast. This may be an interactive media broadcast which the broadcast system is already broadcasting. However, this interactive media broadcast may additionally, or alternatively, be an additional media broadcast, for example for second screen applications which are known as such in the art, for example an internet broadcast or a YouTube channel, that is related to an interactive media broadcast. As such, the user device of a user who is watching interactive broadcast content can be selected to provide user content as part of further media content.

The method may further comprise transmitting user content, for example to a broadcast system, in addition to transmitting the response. In this respect, the method of the invention may be referred to as a method of contributing user content to a media broadcast.

The method of the invention may further comprise requesting user input, that is, requesting a user of the user device to input information, such as program selection information, user content selection information, and/or actual user content provided by a camera and/or microphone of the user device, for example. The method may also comprise receiving user input, and may further comprise including user input in the conditional response.

The invention also provides a software program product comprising a tangible carrier on which instructions are stored which may cause a processor to carry out the method as described above.

The invention further provides a media broadcast system configured for transmitting an interactive media broadcast to user devices, which broadcast system may comprise:
  a network interface configured for:
  transmitting a set of requirements to a first plurality of user devices, the set of requirements relating to using at least part of the user content in the interactive media broadcast, and
  transmitting an invitation to a second plurality of user devices, the invitation being configured to cause a user device to produce a response if the set of capabilities of the user device matches the set of requirements; and
  an processor configured for:
  identifying a group of user devices from which a response was received.

The processor may further be configured for selecting a group of user devices from the identified group of user devices. The processor may still further be configured for additional functions which are not mentioned here.

The invention yet further provides a user device configured to determine its suitability to contribute user content to an interactive media broadcast, which user device may comprise:
  a network interface configured for:
  receiving a set of requirements relating to using at least part of the user content in the interactive media broadcast,
  receiving an invitation configured to produce a conditional response, and
  transmitting the conditional response if the set of requirements matches the set of capabilities; and
  a processor configured for:
  comparing the set of requirements with a set of capabilities stored in the user device.

The user device, and/or auxiliary user device, may further comprise a video screen for playing out video content, and/or a loudspeaker for playing out audio content. The user device, or auxiliary user device, may comprise a desktop computer, a laptop computer, a tablet device, a smartphone, a head-mounted display, and/or any other device that allows the output of video and audio to the user.

The user device, and/or auxiliary user device, may still further comprise media capture means for providing user content, such as a camera and/or a microphone, or the user device and/or auxiliary user device may be connectable to at least one further device comprising such media capture means.

BRIEF DESCRIPTION OF THE DRAWINGS

The present invention will further be explained with reference to exemplary embodiments illustrated in the drawings, in which.

DETAILED DESCRIPTION OF EMBODIMENTS

The present invention provides a method for a broadcast distributor to determine a group of user devices suitable for contributing user content to an interactive media broadcast, such as an interactive television broadcast. The broadcast distributor may transmit, for example broadcast, a set of requirements to a number of user devices. The set of requirements may be broadcast together with a media broadcast.

The set of requirements may relate to using user content in an interactive media broadcast. The broadcast distributor may also transmit an invitation to the group of user devices. The invitation may trigger the user devices to compare the set of requirements with its set of capabilities. If there is a match, then the user device may send a response to the broadcast distributor. The response may allow the broadcast distributor to identify the user device that sent the response. The broadcast distributor may determine a group of devices by identifying the user devices from which a response was received, and which therefore have a set of capabilities that matches the set of requirements.

In some embodiments, a user device may always produce and transmit a response to an invitation, even if there is no match between the set of requirements and the set of capabilities. In such embodiments, a distinction may be made between a positive response, which may correspond with a match, and a negative response, which may correspond with no match. In addition, in such embodiments the method may comprise identifying the user devices from which a positive response was received.

It will be understood that some user devices, such as legacy user devices, may not yet support this method (and may therefore need a software upgrade, for example). There may, therefore, be user devices which may ignore the requirements and/or the invitation and which may not provide a response, even if the capabilities of the user device match the requirements.

Figure 1:
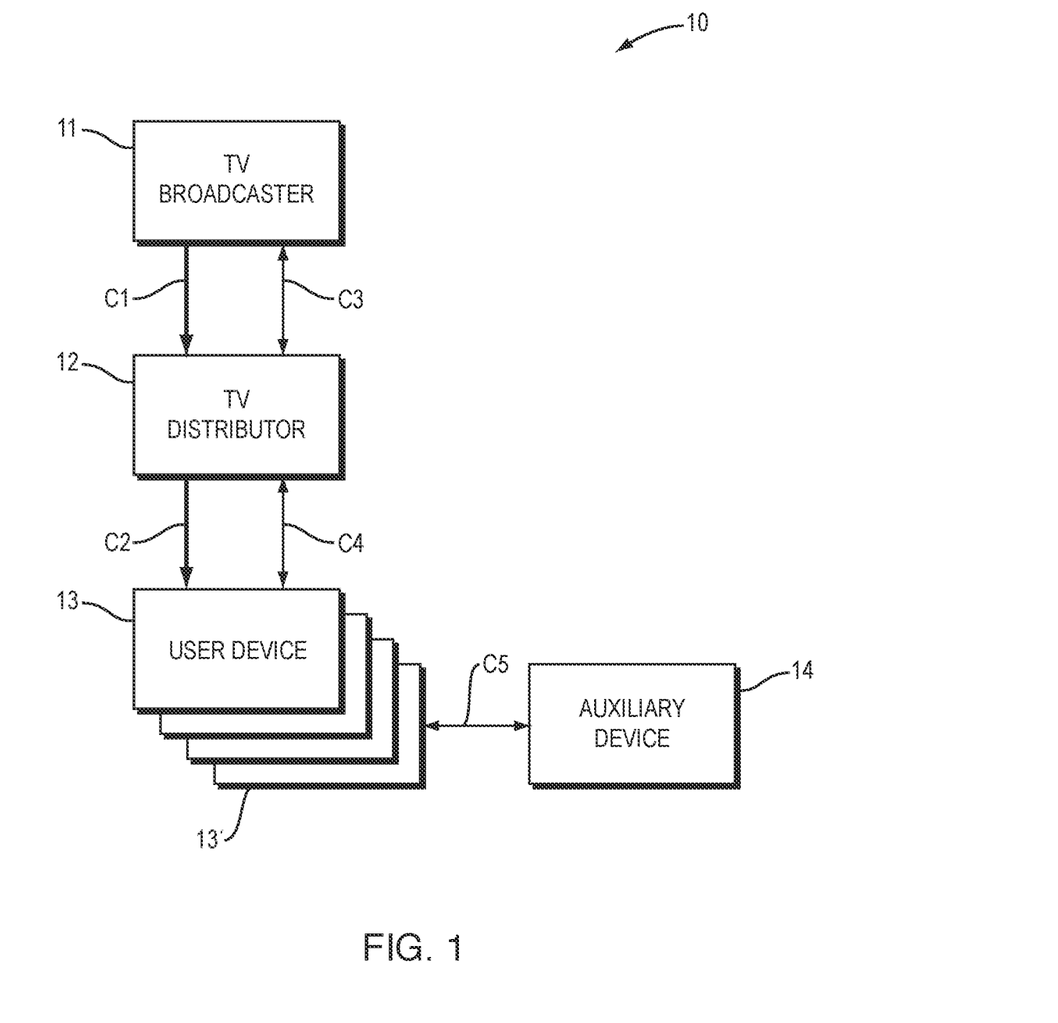
FIG. 1 schematically shows a broadcast system and user devices according to an exemplary embodiment of the invention.

The broadcast system 10 which is schematically illustrated by way of non-limiting example in FIG. 1 may include a TV broadcaster 11 and a TV distributor 12. A number of user devices 13 is connected to the TV distributor 12. The TV broadcaster 11 may, in the present example, provide television content, which may also generally be referred to as media content or original media content. This television content may be transmitted from the TV broadcaster to the TV distributor 12 via a first connection C1, which may be a broadband connection. A third connection C3, which may be a bidirectional connection, may be provided between the TV broadcaster 11 and the TV distributor 12 for transmitting control data.

The TV distributor 12 may distribute TV content to a plurality of user devices 13 via a second connection C2, which may be a broadcast connection, for example a digital broadcast connection using a glass fiber network. A fourth connection C4, which may be a bidirectional connection, may additionally be arranged between the TV distributor 12 and the user devices 13.

In the example shown in FIG. 1, at least one user device 13' is connected to an auxiliary device 14 via a fifth connection C5, which may be a bidirectional connection. The fifth connection C5 may be wireless, and may for example be a Bluetooth® connection. The user device 13' may, for example, be a set-top box, while the auxiliary user device 14 may be a television apparatus. Alternatively, the user device 13' may be a smartphone, while the auxiliary device 14 may be a tablet device. The capabilities of the auxiliary device 14 may complement the capabilities, and hence the capabilities, of the user device 13'.

It is noted that the invention is explained with reference to broadcasting television content, but that the invention is not limited to television content and that other content may be broadcast using another medium, such as internet content (for example YouTube® content). The content is therefore not limited to television programs but may include other content, for example video items, audio items, films, telephone conversations and videophone conversations.

The TV broadcaster 11 may broadcast television content or other content via the TV distributor 12 to the user devices 13 (including 13'). The content broadcast by the TV broadcaster 11 may include television programs such as films, documentaries, news bulletins, etc. In addition, the content may include user content, that is, content contributed by a user. This is schematically illustrated in FIG. 2a, where a content stream 20 is schematically illustrated.

Figure 2A:
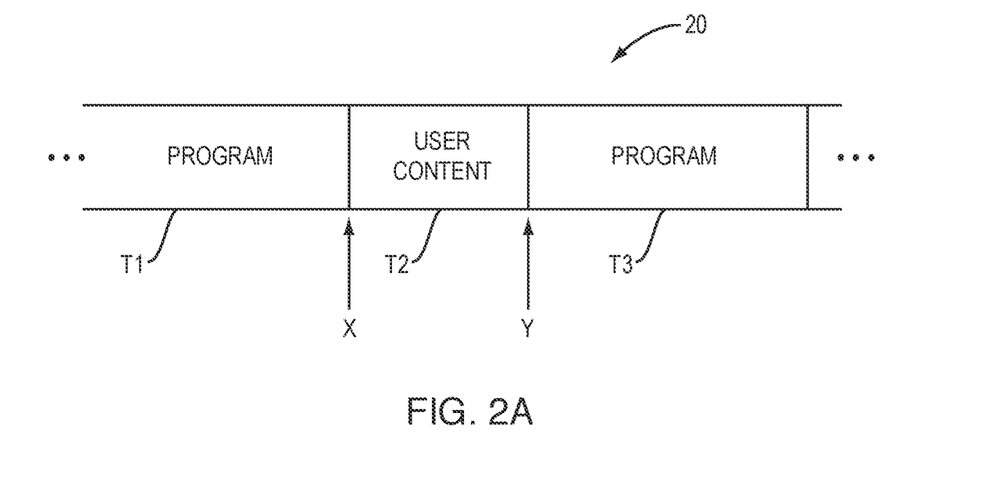
FIG. 2a schematically shows an interactive media broadcast including user content and media content.

The exemplary content stream 20 shown in FIG. 2a may include several time slots, for example the time slots T1, T2 and T3. During the first time slot T1, a television program is broadcast, for example a film. During the third time slot T3, the same or another program may be broadcast. However, during the second time slot T2, user content may be broadcast. As indicated in FIG. 2a, the second time slot during which user content may be broadcast extends from point in time X to point in time Y. It will be understood that a content stream may include multiple time slots for accommodating user content. It will also be understood that the length of time slots may vary.

Furthermore, the time slots illustrated in FIG. 2 are only exemplary and are not limited to complete programs. For example, user content may be used as part of a broadcast, for example a live news program, by allocating a time slot for the user content within the longer duration of the program.

The user content which is to be accommodated in the content stream 20 may originate from a user device 1 and be transmitted to the TV broadcaster 11 or the TV distributor 12, where the user content may be merged, combined or otherwise prepared for use with the television content. Using user content with television content may include inserting user content into a suitable time slot in the content stream.

In some embodiments, the user content may replace the broadcast content. In such embodiments, the user content may replace a part of the content only. In some embodiments, at least part of the user content may be transferred as additional stream within or outside of the broadcast. The user content may include, for example, pictures, short films (videos), sound items (such as speech, songs or tunes), and other items.

User content may have various formats and capabilities, which in turn may depend on the capabilities of the particular user device. Many user devices may not be capable of producing user content in a suitable format for using together with television content. Pictures, for example, may require a certain resolution to be broadcast correctly, and low resolution pictures may not be suitable. Videos may require a certain frame rate and videos with a different frame rate may not be played out correctly. It may therefore be important that the user devices which provide user content have the capabilities required for producing content which is suitable to be used with the programs, that is, with the media content provided with the broadcaster.

Figure 2B:
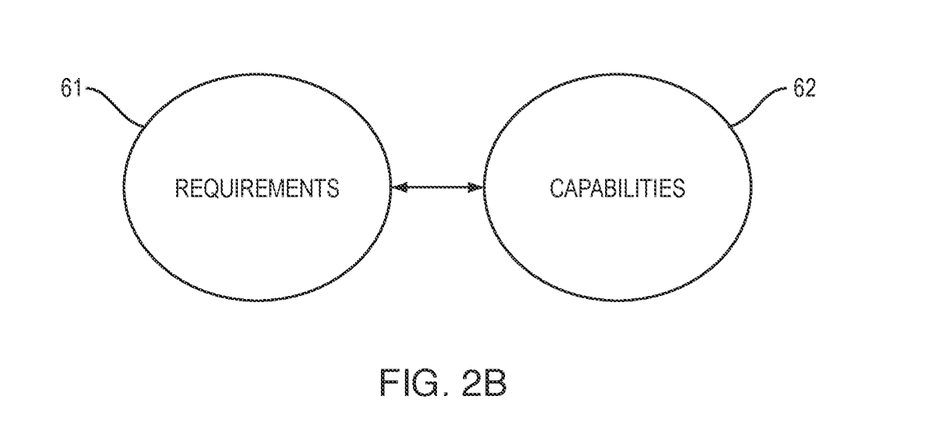
FIG. 2b schematically shows a set of requirements and a set of capabilities as may be used in the present invention.

According to the invention, the requirements of the content to be broadcast are compared with the capabilities of the user device(s). As schematically illustrated in FIG. 2b, the TV broadcaster and/or the TV distributor may have a set of requirements 61, while each user device may have a set of capabilities 62. If the set 61 matches the set 62, then the user device may be suitable for providing suitable user content. It is noted that for a match to occur, it may not be necessary for all requirements to be met, certain requirements may not be met if they are less critical, for example.

Figure 3:
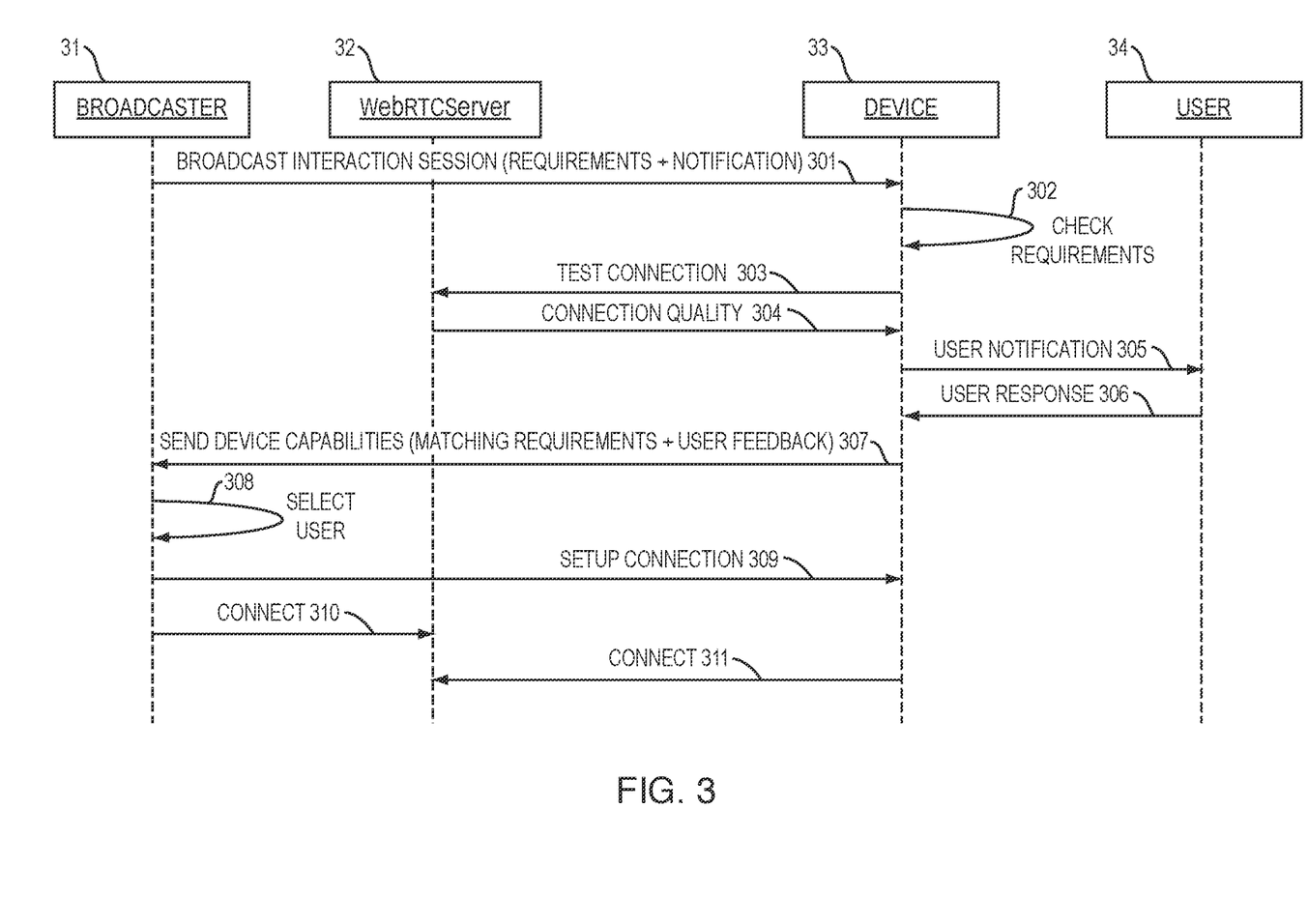
FIG. 3 schematically shows an exemplary embodiment of interaction of devices according to the invention.

A method of exchanging data in a broadcast system is schematically represented in FIG. 3, where the broadcaster 31 may correspond with the broadcaster 11 of FIG. 1, the WebRTC server (see webrtc.org) 32 may correspond with the TV distributor 12 of FIG. 1, and the device 33 may correspond with a user device 13 (or 13') of FIG. 1. Additionally, a user 34 of the user device 33 is schematically illustrated.

The broadcaster 31 broadcasts a Broadcast Interaction Session message (action 301), in which the (set of) requirements for contributing content to a broadcast may be contained. The message may also contain a notification. This notification may contain data to inform the user devices of the possibility to contribute content and may be considered an invitation to contribute user content.

During action 302, a user device 33 may check the requirements. More in particular, a user device 33 may check whether the requirements can be met by comparing the set of requirements with the set of capabilities of the user device (see FIG. 2b).

During action 303, the user device 33 may test the connection with the WebRTC server 32 (which may correspond with the fourth connection C4 in FIG. 1). The WebRTC Server may respond in an action 304, and may provide data from which the connection quality may be derived. In some embodiments, the actions 303 and 304 may be omitted.

During action 305, the user device 33 may send a user notification to the user 34 of the user device 33. The user notification may serve to alert the user to the possibility of providing user content or user input in general, and may include a question to the user, for example asking her whether she wants to submit content. In action 306, the user may respond to the user device, for example by pressing a button or by making a suitable hand gesture, thus providing user control input. That is, in the user response in action 306 the user 34 may indicate whether she is interested in participating in the interactive media broadcast.

During action 307, the user device 33 may send its capabilities to the broadcaster 31. These capabilities may include the matching requirements and any user feedback, or may include only the matching requirements, without the matching or non-matching capabilities. The matching requirements may include a set of requirements which is matched by the capabilities of the user device. The user feedback may include the user response which may have been transmitted during action 306. The matching requirements sent during action 307 may include an identification of the corresponding user devices.

In some embodiments, action 307 may only be carried out if all requirements are matched by user device capabilities. In other embodiments, action 307 may always be carried out, even if not all requirements are matched, in which case the number of matching requirements may be smaller than when all requirements are matched. In some embodiments, action 307 may still be carried out if no requirement is matched, in which case the number of matching requirements may equal zero. In such embodiments, the data sent during action 307 may still contain the user feedback (that is the user response), if there is user feedback.

In action 308, the broadcaster 31 may select the user or users which may contribute user content. This user or these users may be selected from the users whose user feedback indicated that they wanted to contribute, and whose user device match the largest number of requirements, for example, or may be selected only from the users whose user device match all requirements. The user feedback may also include user preferences, for example regarding program content. A suitable group of users may be chosen based upon matching requirements, and user feedback, for example.

During action 309, the broadcaster 31 may set up a connection with each chosen user device 33. During action 310, the broadcaster 31 may set up a connection with the WebRTC Server 32, while during action 311, the user device 33 may also set up a connection with the WebRTC Server 32. It is noted that in this respect the WebRTC Server 32 may only serve to facilitate establishing a connection, while the actual exchange of data (which is not shown in FIG. 3) may be carried out directly between the user device 33 and the broadcaster 31.

Figure 4:
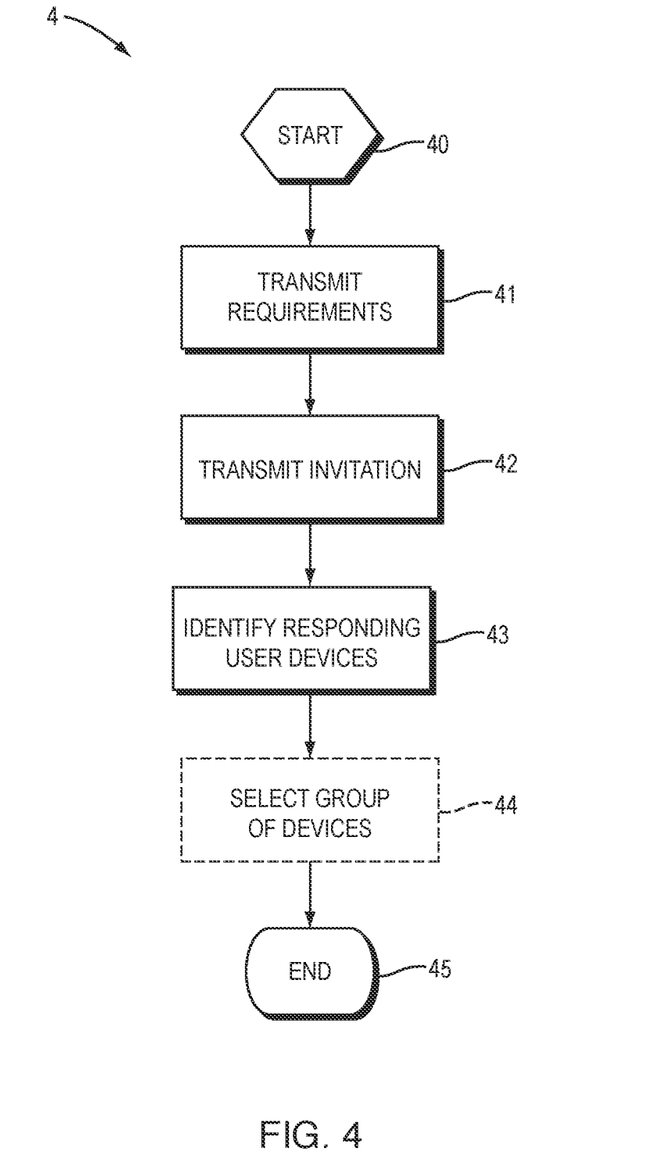
FIG. 4 schematically shows an exemplary embodiment of a method of determining a group of user devices suitable for contributing media content according to the invention.

An exemplary embodiment of a method of determining a group of user devices for contributing user content to an interactive media broadcast is schematically illustrated in FIG. 4. The method 4 of FIG. 4 may start with action 40, in which the method may be initiated. In action 41, the requirements for contributing user content to the intermediate broadcast may be transmitted to the user devices. In some embodiments, transmitting the requirements may include broadcasting the requirements. In action 42, an invitation to contribute may be transmitted to the user devices. In some embodiments, transmitting the invitation may include broadcasting the invitation.

Although actions 41 and 42 are shown in FIG. 4 as two separate and consecutive actions, actions 41 and 42 may also be carried out in reverse order, may be carried out substantially simultaneously, or may be carried out as a single action.

During action 43, the responding user devices may be identified. In the embodiment shown in FIG. 4, only the user devices having capabilities matching the requirements may respond, and therefore the user devices identified in action 43 may be user devices having matching capabilities.

In some embodiments, the method 4 may include an action 44, in which a group of user devices is selected from the user devices identified during action 43. Selecting user devices may be carried out on the basis of user preferences, timing (first come, first served) and/or other criteria, which may include geographical location. The number of selected user devices may therefore be smaller than the number of identified user devices. The method 4 may end during action 45.

Figure 5:
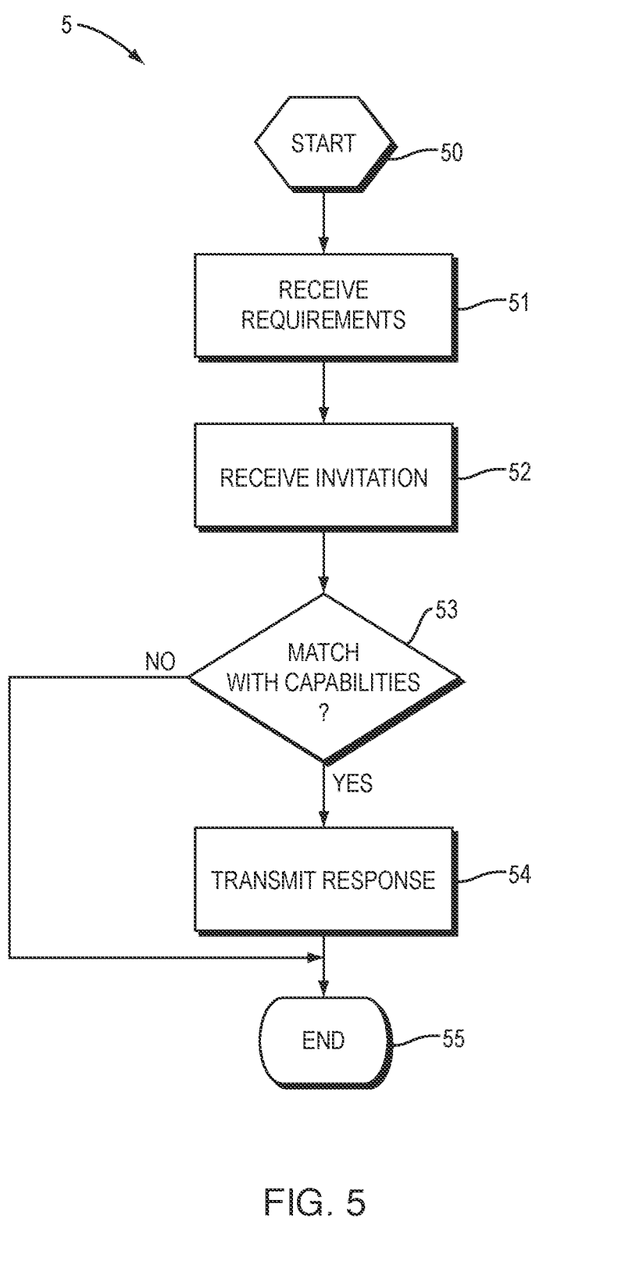
FIG. 5 schematically shows an exemplary embodiment of a method for a user device to determine its suitability to contribute user content to an interactive media broadcast according to the invention.

An exemplary embodiment of a method for a user device to determine its suitability to contribute user content to an interactive media broadcast is schematically illustrated in FIG. 5. The method 5 may start with action 50, during which the method may be initiated. During action 51, the user device may receive a set of requirements. During action 52, the user device may receive an invitation to contribute user content.

Although actions 51 and 52 are shown in FIG. 5 as two separate and consecutive actions, actions 51 and 52 may also be carried out in reverse order, may be carried out substantially simultaneously, or may be carried out as a single action.

During action 53, the received set of requirements may be compared with the set of capabilities of the user device. If the received set of requirements matches the set of capabilities of the user device ("Yes"), the user device may transmit a response during action 54. If the received set of requirements fails to match the set of capabilities of the user device ("No"), the user device may not transmit a response and the method may proceed with action 55, during which the method ends.

In some embodiments, a further action (not shown) may follow action 54, before the method ends in action 55. This further action may include transmitting user content, for example to the broadcast system or part of the broadcast system, such as the TV distributor 12 in FIG. 1.

Figure 6A:
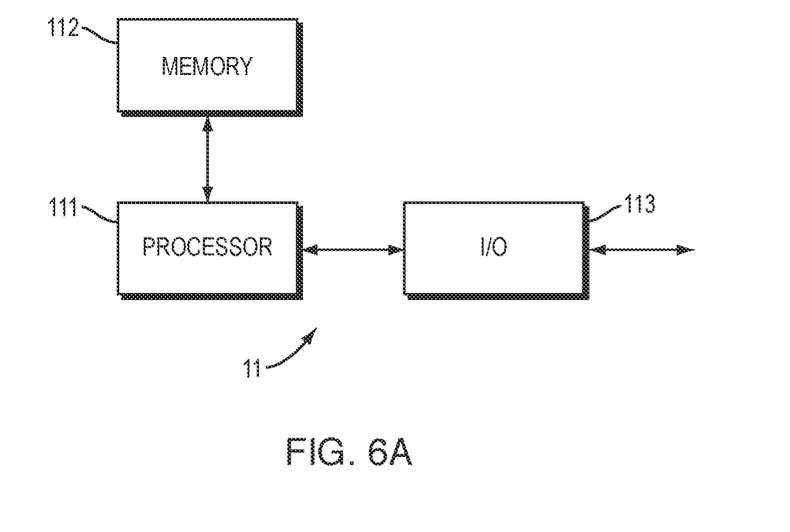
FIG. 6a schematically shows an exemplary embodiment of a media broadcast apparatus according to the invention.

An exemplary embodiment of a media broadcast apparatus according to the invention is schematically shown in FIG. 6a. The media broadcast apparatus 11, which may but does not need to correspond with the TV broadcaster 11 (or the TV distributor 12) in FIG. 1, may include a processor 111, a memory 112 and an input/output (I/O) unit 113. The media broadcast apparatus 11 may include other components which are not shown in FIG. 6a. The I/O unit 113 may serve as a network interface and may be configured for:

transmitting a set of requirements to a first plurality of user devices, the set of requirements relating to using at least part of the user content with media content, and transmitting an invitation to a second plurality of user devices, the invitation being configured to cause a user device to produce a conditional response if the set of capabilities of the user device matches the set of requirements.

The processor may be configured for:

identifying a group of user devices from which a conditional response was received.

The memory 112 may contain suitable software for identifying, selecting and controlling the I/O unit 113.

Figure 6B:
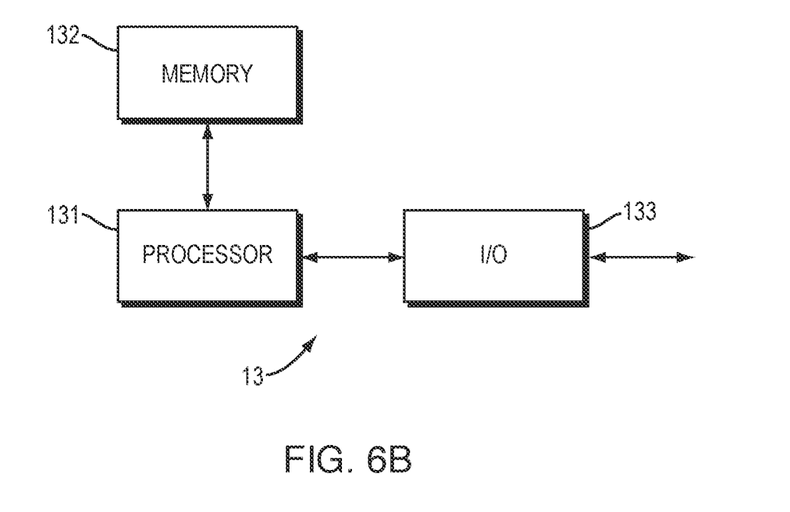
FIG. 6b schematically shows an exemplary embodiment of a user device according to the invention.

An exemplary embodiment of a user device according to the invention is schematically shown in FIG. 6b. The user device 13, which may but does not need to correspond with the user device 13 or 13' in FIG. 1, may include a processor 131, a memory 132 and an input/output (I/O) unit 133. The user device 13 may include other components which are not shown in FIG. 6b.

The I/O unit 133 may constitute an input interface configured for receiving user input. The memory 132 may be configured for storing a set of capabilities of the user device and for storing user content. The processor 131 may be configured for processing control data. The network interface 133 may be configured for:

receiving a set of requirements relating to using at least part of the user content in the interactive media broadcast, receiving an invitation configured to produce a conditional response, and transmitting the conditional response if the set of requirements matches the set of capabilities.

The processor 131 may be configured for:

comparing the set of requirements with a set of capabilities stored in the user device.

The user device 13 may comprise a desktop computer, a laptop computer, a tablet device, a smartphone, a set-top box, a television apparatus, and/or a head-mounted display, for example. As mentioned above, the media content which is broadcast may not be limited to television but may also include other content, such as internet content, music streaming, etc.

Embodiments of the invention may be summarized as:
1. Broadcast an interactive session with requirements,
2. Check whether user devices meet the requirements,
3. Display a user message (in some embodiments),
4. Send client information to the broadcaster (if the user device meets the requirements),
5. Let broadcaster select one or multiple user devices, and
6. Connect client and broadcaster in a real-time communication session.

In some embodiments, the invitation may be broadcast to the user devices (clients) as an extension in the MPEG-DASH delivery manifest, which MPEG-DASH delivery manifest is known per se. The aim of the extension is to signal the availability of an interactive session, which may be related to a certain part of the broadcast. When the regular broadcast continues, the interactive session may end. This is, if the broadcast is delivered via MPEG-DASH, the interactive broadcast opportunity could be signalled in a DASH manifest, shown in pseudo form below:

---

```
Media Presentation
    Period, start = 0s
        (normal dash streaming)
        Adaptation set
            SET 1
                Video
            SET 2
                Audio
    Period, start = 100s
        (opportunity for interactive session, valid for 120 seconds)
        Adaptation set
            SET 1
                Video
```

```
            SET 2
                Audio
            SET 3
                <opportunity type="interactive">
                    <criteria src="https://url.to.broadcaster/eventcriteria.xml/">
                    <notification src="https://url.to.broadcaster/eventinvite.html">
                </opportunity>
    Period, start = 220s
        (normal dash streaming)
        Adaptation set
            SET 1
                Video
            SET 2
                Audio
```

As will be appreciated by those skilled in the art, aspects of the present invention may be embodied as a system, method or computer program product. Accordingly, aspects of the present invention may take the form of an entirely hardware embodiment, a software embodiment (including firmware, resident software, micro-code, etc.) or an embodiment combining software and hardware aspects that may all generally be referred to herein as a "circuit," "module" or "system". Functions described in this disclosure may be implemented as an algorithm executed by a microprocessor of a computer. Furthermore, aspects of the present invention may take the form of a computer program product embodied in one or more computer readable medium(s) having computer readable program code embodied, for example, stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid-state drive, a random access memory (RAM), a non-volatile memory device, a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless (using electromagnetic and/or optical radiation), wired, optical fiber, cable, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the functions noted in the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the invention relates to all possible combinations of features recited in the claims.

Figure 7:
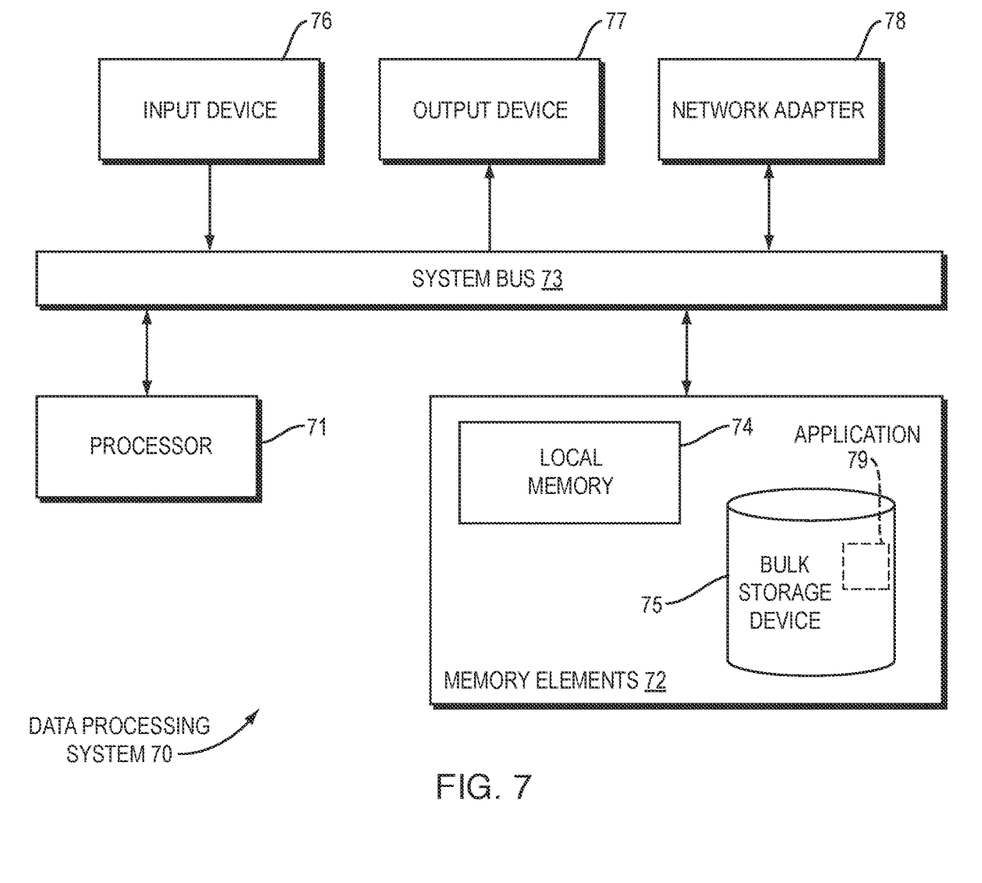
FIG. 7 is a schematic block diagram of a general system to be employed in the disclosed method.

FIG. 7 is a block diagram illustrating an exemplary data processing system that may be used as a part of a user equipment or as a network apparatus, such as a user device or a TV distributor apparatus.

Data processing system 70 may include at least one processor 71 coupled to memory elements 72 through a system bus 73. As such, the data processing system 70 may store program code within memory elements 72. Further, processor 71 may execute the program code accessed from memory elements 72 via system bus 73. In one aspect, data processing system 70 may be implemented as a computer that is suitable for storing and/or executing program code. It should be appreciated, however, that data processing system 70 may be implemented in the form of any system including a processor and memory that is capable of performing the functions described within this specification.

Memory elements 72 may include one or more physical memory devices such as, for example, local memory 74 and one or more bulk storage devices 75. Local memory may refer to random access memory or other non-persistent memory device(s) generally used during actual execution of the program code. A bulk storage device 75 may be implemented as a hard drive or other persistent data storage device. The data processing system 70 may also include one or more cache memories (not shown) that provide temporary storage of at least some program code in order to reduce the number of times program code must be retrieved from bulk storage device 75 during execution.

Input/output (I/O) devices depicted as input device 76 and output device 77 optionally can be coupled to the data processing system 70. Examples of input devices may include, but are not limited to, for example, a keyboard, a pointing device such as a mouse, a touchscreen, or the like. Examples of output device may include, but are not limited to, for example, a monitor or display, speakers, or the like. Input device 76 and/or output device 77 may be coupled to data processing system 70 either directly or through intervening I/O controllers. A network adapter 78 may also be coupled to data processing system 70 to enable it to become coupled to other systems, computer systems, remote network devices, and/or remote storage devices through intervening private or public networks. The network adapter 78 may comprise a data receiver for receiving data that is transmitted by said systems, devices and/or networks to said data processing system 70 and a data transmitter for transmitting data to said systems, devices and/or networks. Modems, cable modems, and Ethernet cards are examples of different types of network adapters that may be used with data processing system 70.

As pictured in FIG. 7, memory elements 72 may store an application 79. It should be appreciated that data processing system 70 may further execute an operating system (not shown) that can facilitate execution of the application. Applications implemented in the form of executable program code can be executed by data processing system 70, for example, by processor 71. Responsive to executing the application 79, the data processing system 70 may be configured to perform one or more operation as disclosed in the present application in further detail.

In one aspect, for example, data processing system 70 may represent a TV distributor apparatus or a TV broadcaster apparatus. In that case, the application 79 may represent an application which, when executed, configures data processing system 70 to perform the various functions described in this document with reference to transmitting requirements and invitations, and with reference to processing responses from user devices.

The user equipment may include, but is not limited to, a personal computer, a portable computer, a mobile phone, or the like.

In another aspect, data processing system 70 may represent a user device as described herein, in which case application 79, when executed, may configure data processing system 70 to perform operations as described in the present disclosure.

Figure 8:
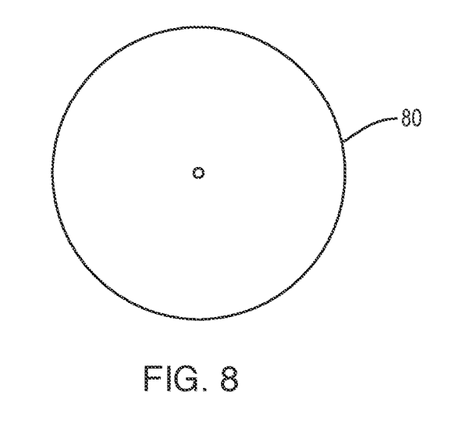
FIG. 8 schematically shows a software program product according to an exemplary embodiment of the invention.

FIG. 8 schematically shows an exemplary software program product 80.

It is noted that the method has been described in terms of steps to be performed, but it is not to be construed that the steps described must be performed in the exact order described and/or one after another. One skilled in the art may envision to change the order of the steps and/or to perform steps in parallel to achieve equivalent technical results.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The abstract should not be used to limit the scope of the claims, and neither should reference numbers in the claims.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Various embodiments of the invention may be implemented as a program product for use with a computer system or a processor, where the program(s) of the program product define functions of the embodiments (including the methods described herein). In one embodiment, the program(s) can be contained on a variety of non-transitory computer-readable storage media (generally referred to as "storage"), where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (for example, read-only memory devices within a computer such as CD-ROM disks readable by a CD-ROM drive, ROM chips or any type of solid-state non-volatile semiconductor memory) on which information is permanently stored; and (ii) writable storage media (for example, flash memory, floppy disks within a diskette drive or hard-disk drive or any type of solid-state random-access semiconductor memory) on which alterable information is stored.

It will therefore be understood by those skilled in the art that the present invention is not limited to the embodiments mentioned above and that many additions and modifications are possible without departing from the scope of the invention as defined in the appending claims.

The invention claimed is:

1. A computer-implemented method of determining a group of user devices suitable for contributing user content to an interactive media broadcast, the method comprising:
  broadcasting in metadata with the interactive media broadcast a set of requirements to a first plurality of user devices, each user device among the first plurality of user devices having a set of capabilities, the set of requirements relating to using at least part of the user content in the interactive media broadcast,
  broadcasting in metadata an invitation to a second plurality of user devices, the invitation being configured to cause a user device among the second plurality of user devices to produce a conditional response in response to the set of capabilities of the user device matching the set of requirements, wherein each of the second plurality of user devices is able to communicate with a respective auxiliary user device,
  the method further comprising by each user device of the second plurality of user devices:
  receiving in the metadata with the interactive media broadcast the set of requirements,
  receiving the broadcast metadata comprising the invitation, wherein the set of capabilities includes auxiliary capabilities of the respective auxiliary user device with which the user device is able to communicate,
  forwarding the set of requirements to the respective auxiliary user device, and receiving auxiliary capabilities from the respective auxiliary user device,
  comparing, by a processor of each user device, the set of requirements with the set of capabilities stored in the user device,
  transmitting the response in response to the set of requirements matching the set of capabilities, and
  transmitting the user content, and
  the method further comprising by the media broadcast system:
  identifying, by a processor of the media broadcast system, an identified group of user devices among the second plurality of user devices from which a conditional response was received;
  receiving the user content from the identified group of user devices, and
  broadcasting the interactive media broadcast comprising at least part of the received user content from multiple user devices of the identified group of user devices.

2. The method according to claim 1, further comprising: selecting a selected group of user devices from the identified group of user devices.

3. The method according to claim 2, wherein the selected group of user devices includes all user devices from which a conditional response was received.

4. The method according to claim 1, wherein transmitting the set of requirements and transmitting the invitation is carried out in a single transmission.

5. The method according to claim 1, wherein the requirements further relate to at least one of:
  user device characteristics,
  connection characteristics,
  sensory data,
  location data,
  user environment,
  media capture conditions, and
  user personal data.

6. The method according to claim 1, further comprising: establishing a connection with each user device of the identified group of user devices to receive the user content.

7. A computer-implemented method for a user device to determine its suitability to contribute user content to an interactive media broadcast, the method comprising:
  receiving in metadata with the interactive media broadcast a set of requirements, the set of requirements relating to using at least part of the user content in the interactive media broadcast,
  receiving broadcast metadata comprising an invitation, the invitation configured to cause the user device to produce a response in response to the set of requirements matching the a set of capabilities, wherein the set of capabilities includes auxiliary capabilities of an auxiliary user device with which the user device is able to communicate,
  forwarding the set of requirements to the auxiliary device, and receiving auxiliary capabilities from the auxiliary user device,
  comparing, by a processor of the user device, the set of requirements with the set of capabilities stored in the user device, and transmitting the response in response to the set of requirements matching the set of capabilities, and
  transmitting the user content.

8. The method according to claim 7, further comprising including at least one capability of the set of capabilities in the response.

9. The method according to claim 7, further comprising requesting user input, receiving user input, and including user input in the response.

10. A software program product comprising a non-transitory tangible carrier storing instructions which cause a processor to carry out the method according to claim 7.

11. A user device configured to determine its suitability to contribute user content to an interactive media broadcast, the user device comprising:

a data receiver configured for:
    receiving in metadata with the interactive media broadcast a set of requirements, the set of requirements relating to using at least part of the user content in the interactive media broadcast,
    receiving broadcast metadata comprising an invitation, the invitation configured to produce a response if the set of requirements matches a set of capabilities, wherein the set of capabilities includes auxiliary capabilities of an auxiliary user device with which the user device is able to communicate;
    forwarding the set of requirements to the auxiliary user device, and receiving auxiliary capabilities from the auxiliary user device, and
    transmitting the response if the set of requirements matches the set of capabilities,
and
a processor configured for:
    comparing the set of requirements with a set of capabilities stored in the user device; and
    transmitting the user content.

12. The user device according to claim 11, wherein at least one capability of the set of capabilities is included in the response.

13. The user device according to claim 11, wherein the processor is further configured to request user input, to receive user input, and to include user input in the response.

14. A system comprising a plurality user devices and a media broadcast system configured for transmitting an interactive media broadcast to the plurality of user devices, the media broadcast system comprising:
a data transmitter configured for:
    broadcasting in metadata with the interactive media broadcast a set of requirements to the plurality of user devices, the set of requirements relating to using at least part of the user content in the interactive media broadcast, and
    broadcasting in metadata an invitation to a second plurality of user devices, the invitation being configured to cause a user device among the second plurality of user devices to produce a conditional response if the set of capabilities of the user device matches the set of requirements, wherein the set of capabilities includes auxiliary capabilities of an auxiliary user device with which the user device is able to communicate; and
a processor configured for:
    identifying a group of user devices among the second plurality of user devices from which a conditional response was received,
    receiving user content from the identified group of user devices, and
    broadcasting the interactive media broadcast comprising at least part of the received user content from multiple user devices of the identified group of user devices; and
wherein each of the second plurality of user devices is configured to determine its suitability to contribute user content to an interactive media broadcast, wherein each of the second plurality of user devices is able to communicate with a respective auxiliary user device, each of the second plurality of user devices comprising:
a data receiver configured for:
    receiving in the metadata with the interactive media broadcast the set of requirements,
    receiving the broadcast metadata comprising the invitation, the invitation configured to produce the response if the set of requirements matches the set of capabilities;
    forwarding the set of requirements to the respective auxiliary user device, and receiving auxiliary capabilities from the respective auxiliary user device, and
    transmitting the response to the media broadcast system if the set of requirements matches the set of capabilities; and
a processor configured for:
    comparing the set of requirements with the set of capabilities stored in the user device, and
    transmitting the user content to the media broadcast system.

* * * * *

UNITED STATES PATENT AND TRADEMARK OFFICE
CERTIFICATE OF CORRECTION

| | |
|---|---|
| PATENT NO. | : 11,317,135 B2 |
| APPLICATION NO. | : 16/472796 |
| DATED | : April 26, 2022 |
| INVENTOR(S) | : Martin Prins, Hans Maarten Stokking and Simon Gunkel |

It is certified that error appears in the above-identified patent and that said Letters Patent is hereby corrected as shown below:

In the Claims

In Claim 7, Column 18, Line 43, delete "the" before "a set"

Signed and Sealed this
Seventh Day of June, 2022

Katherine Kelly Vidal
*Director of the United States Patent and Trademark Office*